(12) United States Patent
Bueb

(10) Patent No.: US 8,321,775 B2
(45) Date of Patent: Nov. 27, 2012

(54) NON-VOLATILE MEMORY WITH EXTENDED ERROR CORRECTION PROTECTION

(75) Inventor: Christopher Bueb, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 852 days.

(21) Appl. No.: 12/427,706

(22) Filed: Apr. 21, 2009

(65) Prior Publication Data

US 2010/0269017 A1    Oct. 21, 2010

(51) Int. Cl.
*G06F 11/00* (2006.01)
(52) U.S. Cl. .......................................... 714/799; 714/767
(58) Field of Classification Search .................. 714/763, 714/758, 799, 764, 767, 768, 772
See application file for complete search history.

(56) References Cited

U.S. PATENT DOCUMENTS

| 7,080,309 | B2 |   | 7/2006 | Sharma |         |
|-----------|----|---|--------|--------|---------|
| 7,447,948 | B2 | * | 11/2008 | Galbi et al. ................... | 714/701 |
| 7,539,052 | B2 |   | 5/2009 | Aritome |         |
| 8,122,323 | B2 | * | 2/2012 | Leung et al. ................... | 714/774 |
| 2008/0168320 | A1 |   | 7/2008 | Cassuto et al. |         |
| 2008/0222490 | A1 | * | 9/2008 | Leung et al. ................... | 714/763 |
| 2009/0024903 | A1 | * | 1/2009 | Bueb ............................. | 714/764 |
| 2009/0187803 | A1 | * | 7/2009 | Anholt et al. ................. | 714/752 |

FOREIGN PATENT DOCUMENTS

| EP | 1912121 A1 | 4/2008 |
| WO | 01/63613 A1 | 8/2001 |

OTHER PUBLICATIONS

Richard A. Flower., "Communications via updates of shared Memory [Corresp.)", IEEE Transactionso N Informationt Heory,vol. IT-28,No. 4,Jul. 1982, pp. 651-655.*
Sun et al., "Design of on-chip error correction systems for multilevel NOR and NAND flash memories", IET Circuits Devices Syst., 2007, 1, (3), pp. 241-249.

* cited by examiner

*Primary Examiner* — Dieu-Minh Le
(74) *Attorney, Agent, or Firm* — Knobbe Martens Olson & Bear LLP

(57) ABSTRACT

Embodiments of the present disclosure provide methods and apparatuses related to NVM devices with extended error correction protection. In some embodiments, a parity cache is used to store parity values of data values stored in a plurality of codewords of an NVM device. Other embodiments may be described and claimed.

24 Claims, 6 Drawing Sheets

NON-VOLATILE MEMORY WITH EXTENDED ERROR CORRECTION PROTECTION

FIELD

Embodiments of the present disclosure relate to the field of memory, and more particularly, to non-volatile memory (NVM) with extended error correction protection.

BACKGROUND

Error correction code (ECC) is widely utilized to reflect data values stored in NVM devices to avoid read errors. Parity is one of the common ECC protection schemes. For an NVM device, a set of data cells and its corresponding parity cells is called a codeword.

For NVM devices that can only be programmed uni-directionally, such as flash memories, a series of data values may be written into data cells of a codeword within a programming cycle, however, parity cell(s) of the codeword may not be programmed correspondingly without any intervening erase operations. This is because a subsequent write operation normally requires at least one state of the parity cell(s) of the codeword to be reversely programmed which cannot be achieved by uni-directionally programmed NVM devices. So, currently when data cells in a codeword are programmed for a second time, the parity cells have to be disabled to avoid errors caused by unmatched parity values.

For NVM devices that can be programmed bi-directionally, such as phase change memories (PCM), the parity cells in a codeword have to be programmed every time when a data is written into the codeword, which may cause reliability problems of the parity cells.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the present disclosure, the phrase "A and/or B" means "(A), (B), or (A and B)." For the purposes of the present disclosure, the phrase "A, B, and/or C" means "(A), (B), (C), (A and B), (A and C), (B and C), or (A, B and C)."

Various logic blocks may be introduced and described in terms of an operation provided by the blocks. These logic blocks may include hardware, software, and/or firmware elements in order to provide the described operations. While some of these logic blocks may be shown with a level of specificity, e.g., providing discrete elements in a set arrangement, other embodiments may employ various modifications of elements/arrangements in order to provide the associated operations within the constraints/objectives of a particular embodiment.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
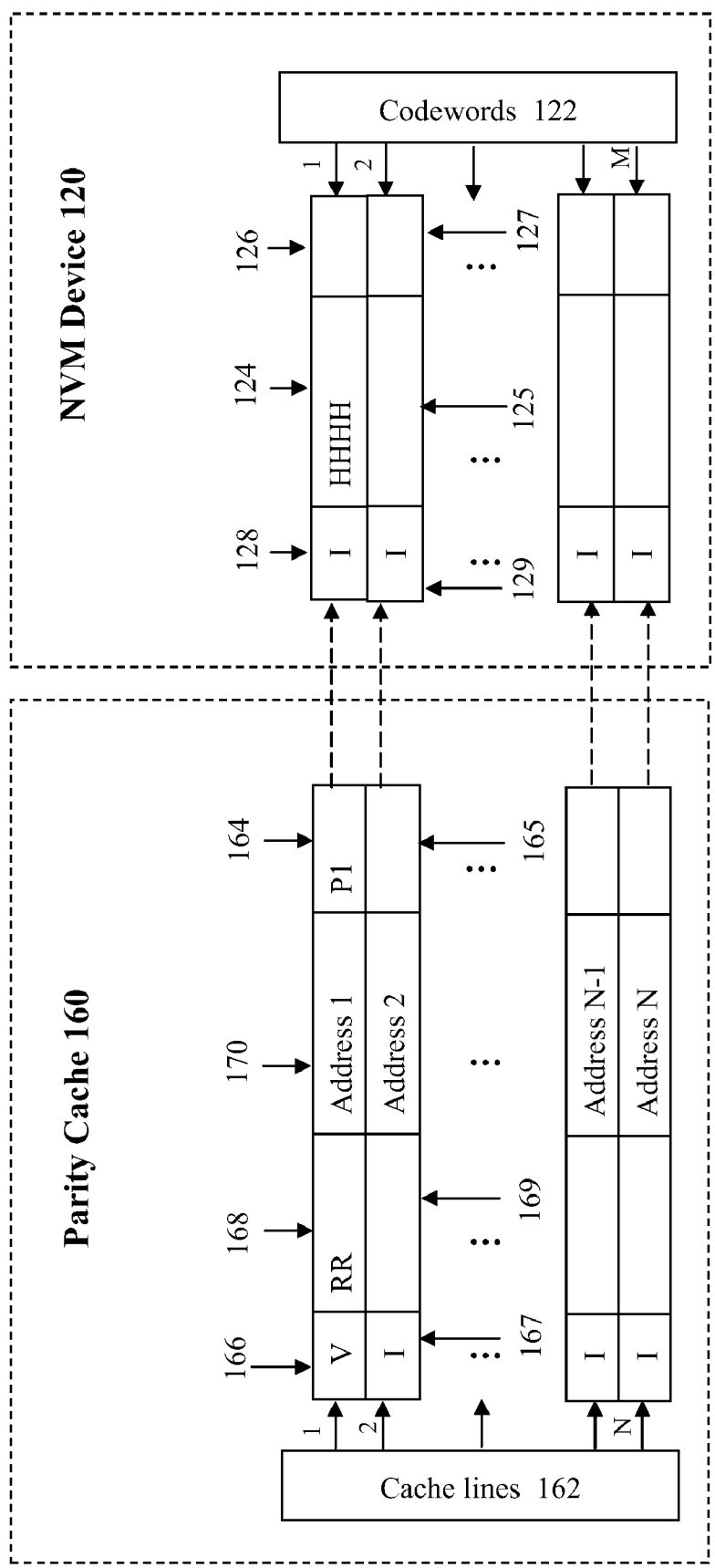
FIG. 1 illustrates a situation before writing one or more data into a NVM device with extended ECC protection in accordance with an embodiment.
Figure 2:
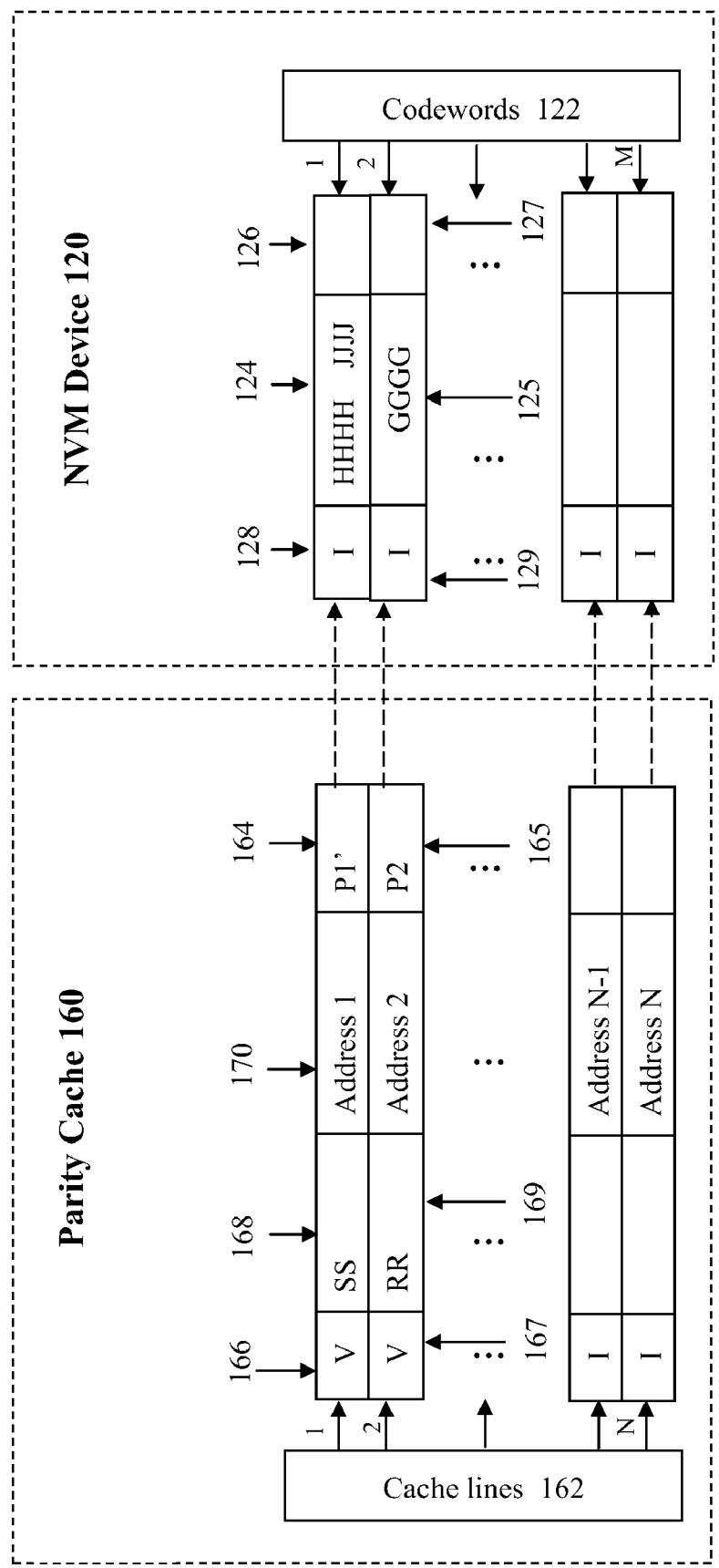
FIG. 2 illustrates a situation after writing the one or more data into the NVM device with extended ECC protection in accordance with an embodiment.

FIG. 1 and FIG. 2 illustrate the situations before and after one or more data are written into an NVM device 120 with extended ECC protection in accordance with one embodiment. In various embodiments, a parity cache 160, which may reside in a volatile memory, may be employed to facilitate the NVM device 120 in extending the ECC protection of data values stored in NVM device 120. In one embodiment, the parity cache 160 and the NVM device 120 may be included in the same chip.

In one embodiment, the NVM device 120 may comprise M codewords 122, where M is an integer. Each of the codewords 122 may include a plurality of data cells configured to store a data value and a plurality of parity cells configured to store a parity value corresponding to the data value stored in the same codeword. Each codeword 122 may also have a parity value validity indicator configured to show if the plurality of parity cells of the codeword 122 are enabled or disabled.

In various embodiments, the parity cache 160 may have N cache lines 162, where N is an integer. In one embodiment, integer M may be equal to the integer N. In one embodiment, M may not be equal to N and the parity values of the codewords 122 may be stored in the parity cache 160 only when necessary. The determination of the necessary situations will be described later in this specification.

In various embodiments, each cache line 162 may include an address field 170 to store an address value that is associated with the codeword to which the cache line 162 corresponds. In various embodiments, the corresponding relationship between the codewords 122 and the cache lines 162 may not be fixed. Each cache line 162 may also comprise a cache line validity indicator configured to show if the cache line 162 is valid or not. In various embodiments, each cache line 162 may also include a write sequence indicator configured to show the relative sequence in which all the cache lines were updated.

In various embodiments, as illustrated in FIG. 1, the data cells 124 of the codeword 122-1 may have a first data value including a word HHHH stored therein and the data cells 125 of the codeword 122-2 may have no data stored therein, e.g., they may be in an erase state. A parity value P1, reflecting the first data value including the word HHHH in data cells 124, may be stored in the cache line 162-1 of the parity cache 160 and a parity value validity indicator 128 may be set as "I" to indicate that the parity cells 126 of the codeword 122-1 is disabled regardless whether there is data in the parity cells 126 or not. In one embodiment, the cache line validity indicator 166 may be set as "V" to indicate that the cache line 162-1 is valid.

As shown in FIG. 2, the first data value stored in the codeword 122-1 may be changed to a second data value through writing another word JJJJ into the data cells 124 of the codeword 122-1. Correspondingly, the parity value P1 stored in the cache line 162-1 may be modified to P1 to reflect the second data value including words HHHH and JJJJ stored in the data cells 124. The settings of the parity value validity indicator 128 and the cache line validity indicator 166 may be kept unchanged such that the parity cells 126 in codeword 122-1 may still be disabled and the cache line 162-1 may still be shown as valid.

In various embodiments, a word GGGG may be written into the data cells 125 of the codeword 122-2. A parity value P2 which reflects the word GGGG may be written into the cache line 162-2 and the cache line validity indicator 167 of the cache line 162-2 may be set to "V" to show that the cache line 162-2 is valid. The parity value validity indicator 129 of the codeword 122-2 may be set to "I" to show that the parity cell 127 is disabled.

Figure 3:
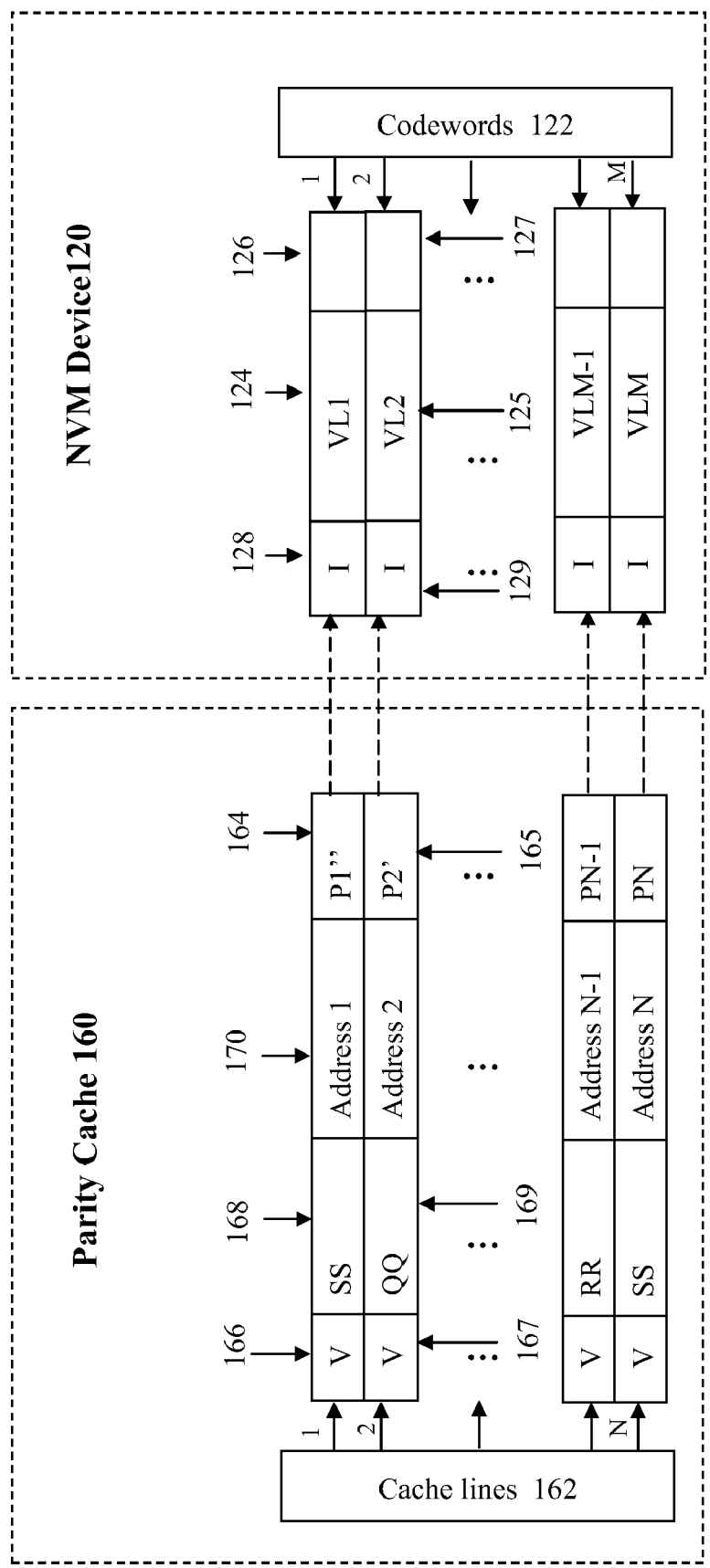
FIG. 3 illustrates a situation before flushing a parity value from a parity cache to the NVM device in accordance with an embodiment.
Figure 4:
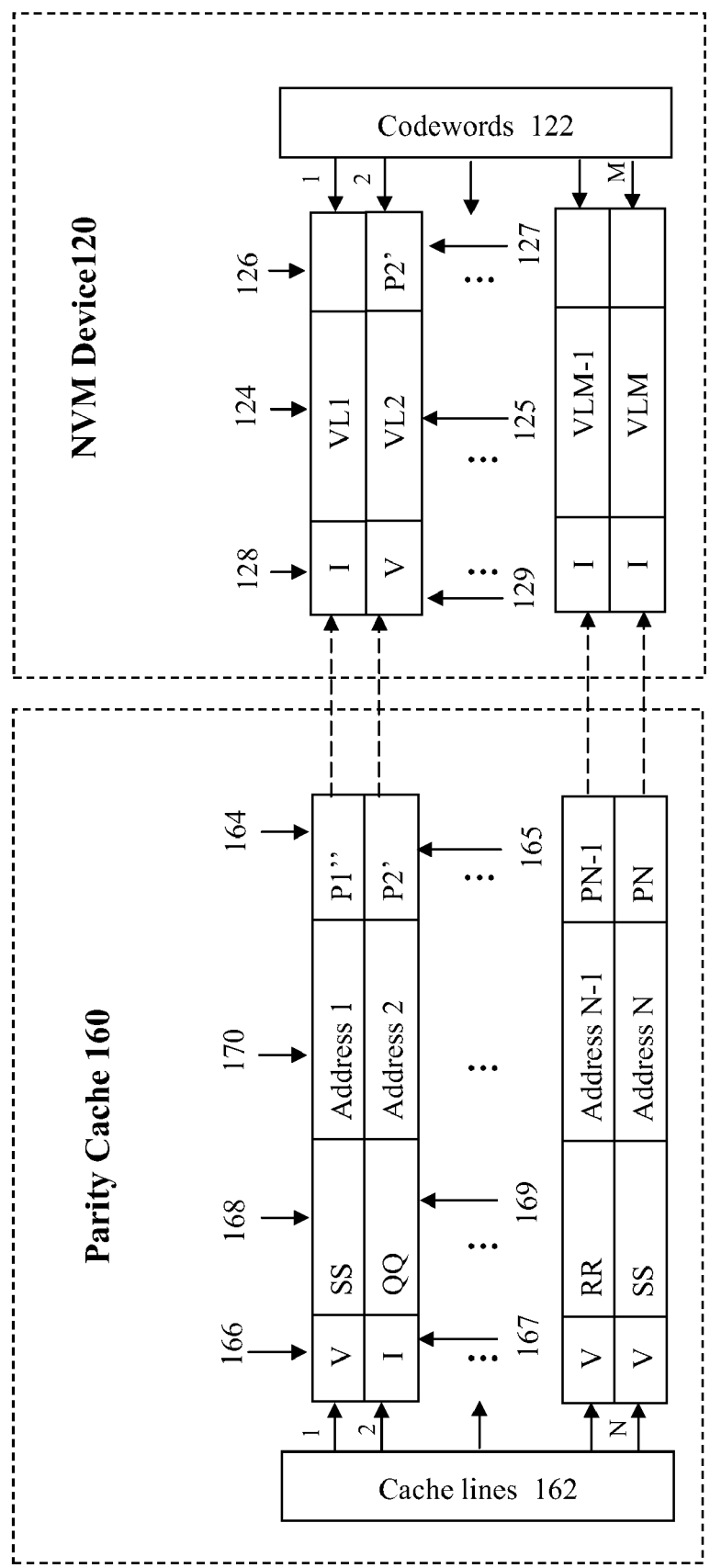
FIG. 4 illustrates a situation after flushing the parity value from a parity cache to the NVM device in accordance with an embodiment.

FIGS. 3 and 4 illustrate the situations before and after a parity value is flushed out from the parity cache 160 to the NVM device 120 with extended ECC protection in accordance with one embodiment. In various embodiments, the parity cache 160 may be full and it may be desirable for one or more parity values to be flushed out from the parity cache 160 so that the corresponding one or more cache lines may be overwritten and used to accommodate one or more new parity values. In various embodiments, parity values may be flushed out from the parity cache 160 under other situations, for example, when a power loss occurs, parity values in the parity cache 160 may be flushed out to minimize the lost of parity values. In various embodiments, when one or more of the codewords 120 are to be erased, the parity values of these codewords may be flushed out from the parity cache 160 and the parity cells of these codewords may be enable to store the flushed-out parity values.

In one embodiment, parity values in cache lines that are least recently written may be flushed out. In another embodiment, parity values to be flushed out from the parity cache 160 may be determined randomly.

As shown in FIG. 3, the cache line validity indicator in each of the cache lines 162 may be set as "V" showing that all cache lines in the parity cache 160 are valid. In one embodiment, a write sequence indicator may be used to show when a cache line 162 was written relative to other cache lines so that parity values in the least recently written cache lines may be flushed out from the parity cache 160. In one embodiment, as shown in FIG. 3, the value "QQ" of the write sequence indicator 169 may indicate that the cache line 162-2 has been the least recently written and the parity value P2' stored therein may be flushed out from the parity cache 160.

In one embodiment, as shown in FIG. 4, the parity value P2' in the cache line 162-2 reflecting data value VL2 in codeword 122-2 may be flushed out and be stored in the corresponding parity cells 127 of the codeword 122-2 in the NVM device 120. In one embodiment, the cache line validity indicator 167 may be set as "I" to show that the cache line 162-2 is no longer valid and the parity value validity indicator 129 may be set as "V" to show that the parity cells 127 of the codeword 122-2 in the NVM device 120 is enabled. In various embodiments, cache line 122-2 may be overwritten and used to store a new parity value after the parity value P2' is flushed out.

Figure 5:
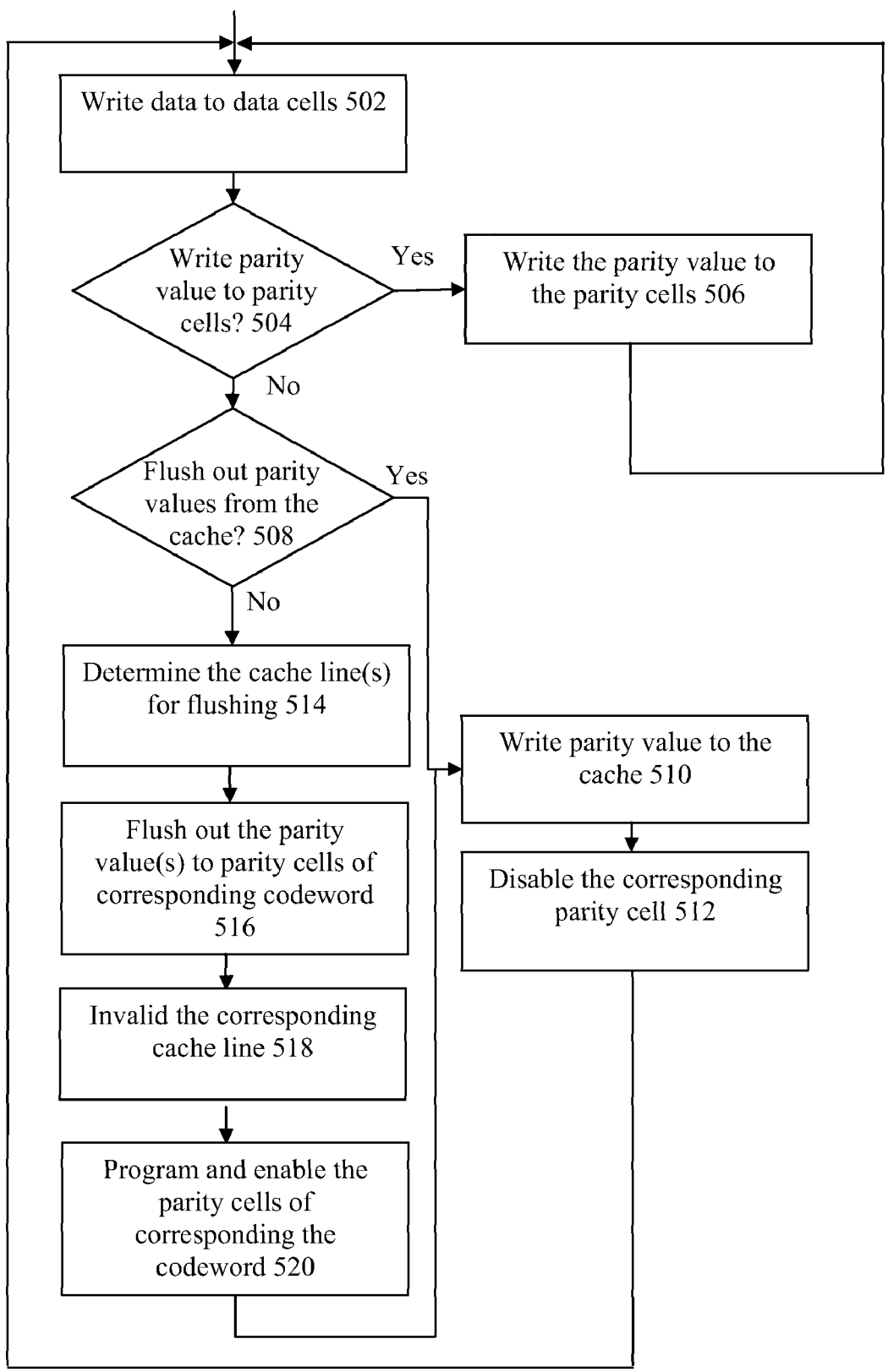
FIG. 5 illustrates a method for operating a NVM device with extended ECC protection in accordance with an embodiment.

FIG. 5 is a flowchart depicting a method for a controller configured to operate an NVM device with extended ECC protection within a programming cycle in accordance with various embodiments. A programming cycle, as used herein, may be a consecutive series of programming iterations upon a codeword without an intervening erase operation. A controller, as used herein, may be any type of controlling device/logic that may implement the following described operations, and the controller may include firmware, state machine or microcode, and so forth.

At block 502, a controller may write a data to a codeword of the NVM device with extended ECC protection resulting a data value. At block 504, the controller may determine if a parity value reflecting the data value in the codeword should be written into parity cells of this codeword in the NVM device or not.

In various embodiments, this determination at block 504 may be made based on the number of protected writes W remaining in the programming cycle that the parity cells of the codeword can be programmed coherently with the data cells to reflect a data value stored in the same codeword. In one embodiment, if this number W is lower than a pre-determined threshold K, then the parity value may be written to the parity cache, otherwise the parity value may be stored in the parity cells of the codeword.

In one embodiment, the number W may be determined based at least on the total number of times T that the parity cells of the codeword can be unidirectionally programmed in each programming cycle while still maintaining the coherency with the data cells, and the number of times P that the parity cells of the codeword have been unidirectionally programmed in the programming cycle. In one embodiment, the numbers P and T may be determined based at least on the number of the parity cells and the type of the parity cells. In one embodiment, the number P may be determined based on the states of the parity cells of the codeword. In one embodiment, when there is no data existing in the data cells of the codeword prior to the writing at block 502, the parity value of the first written data value may be stored in the parity cells of the codeword.

In various embodiments, the determination at block 504 may also be based on the likelihood of the codeword to be re-written. In one embodiment, the likelihood of the codeword to be re-written may be based on the data that already exist in the codeword prior to block 502. In another embodiment, if the data already exist in the codeword is large, for example 16 bits, then the likelihood of the codeword to be re-written may be low, therefore the parity value may be stored in the parity cells.

In various embodiments, the likelihood of the codeword to be re-written may also be based on data that is being written to the codeword. In one embodiment, when the data that is being written to the codeword is small, for example 2 bits, the likelihood of the codeword to be re-written may be high, therefore the parity value may be stored in the parity cache. In other embodiments, the determination at block 504 may be made based on criteria defined by users for different applications.

At block 506, based on the determination made at block 504, the controller may write the parity value into the parity cells of the codeword. In one embodiment, the controller may go back to block 502 to write a new data to the codeword.

In one embodiment, if it is determined at block 504 that the parity value should not be written into the parity cells of the codeword, the controller may determine at block 508 if any parity values need to be flushed out from the parity cache. In one embodiment, the determination may be made based at least on whether the number of empty cache lines is below a pre-determined threshold E, where E is an integer.

In one embodiment, if the number of empty cache lines is larger than the pre-determined threshold E, the controller may go to block 510 to write the parity value into the parity cache. At block 512, the controller may disable the parity cells of the corresponding codeword. Then the controller may go back to block 502 to write a new data to the codeword again.

In one embodiment, if at block 508 it is determined that the number of empty cache lines is smaller than the threshold value E, which means one or more parity values stored in one or more cache lines may need to be flushed out from the parity cache. At block 514 the controller may search for one or more cache lines for flushing. In one embodiment, the controller may randomly choose cache lines for flushing. In another embodiment, the controller may choose the least recently written cache lines for flushing. The least recently written cache lines may be found based at least on the value of the write sequence indicator of each cache line.

In one embodiment, a least recently written cache line may be located and the controller at block 516 may flush the parity value stored in this least recently written cache line out to the parity cells of a corresponding codeword in the NVM device. This least recently written cache line with flushed out parity value may be indicated as invalid at block 518. At block 520, parity cells of the corresponding codeword may be programmed based on the flushed out parity value and may be enabled. The controller may go to block 510 to overwrite the least written cache line and write in the parity value that is determined to be written to the parity cache at block 504.

Figure 6:
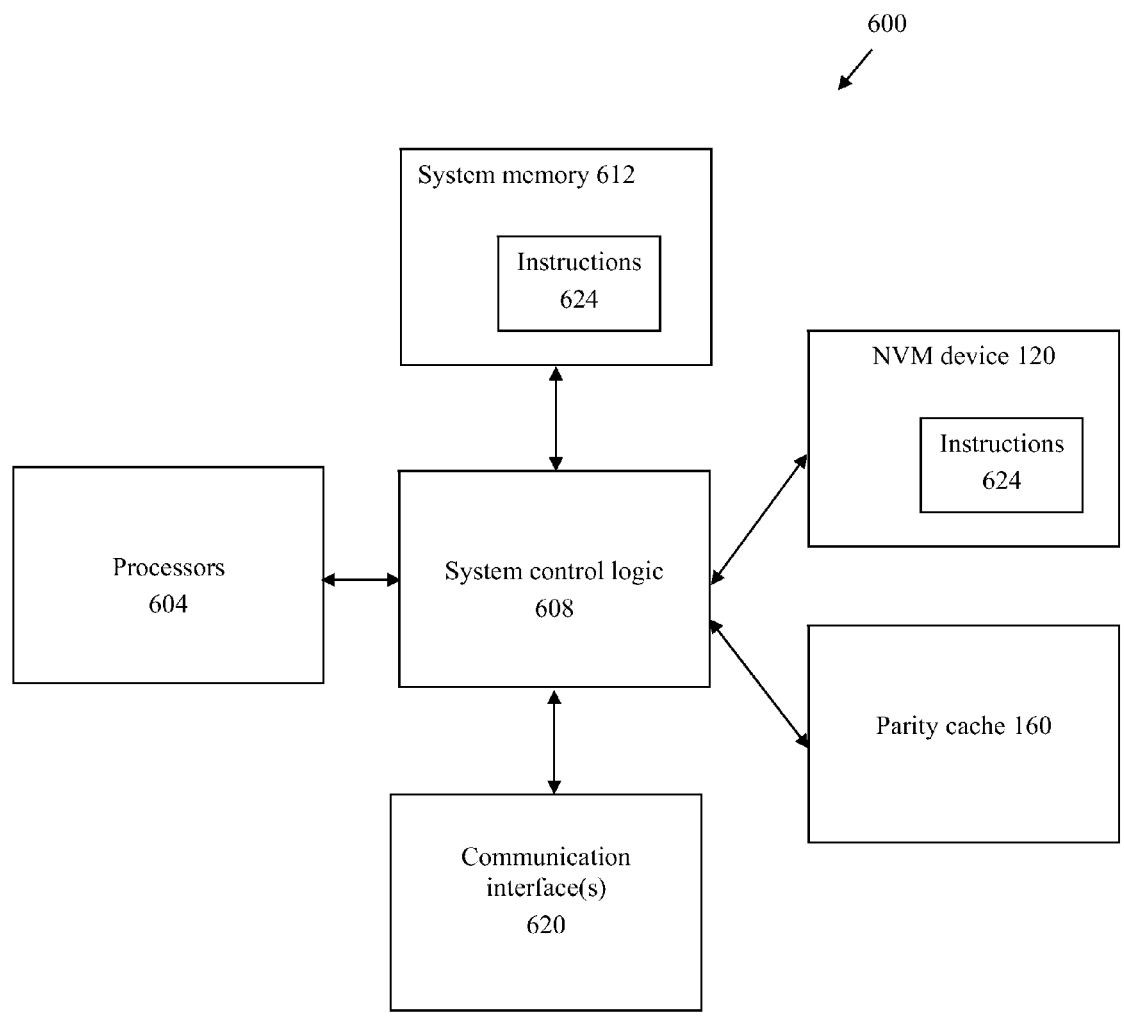
FIG. 6 illustrates a host device incorporating an NVM device with extended ECC protection in accordance with an embodiment.

FIG. 6 illustrates a host device 600 that may host the NVM device 120 and parity cache 160 in accordance with some embodiments. The host device 600 may include one or more processors 604; system control logic 608 coupled to at least one of the processor(s) 604; system memory 612 coupled to the system control logic 608; the NVM device 120 and parity cache 160 coupled to the system control logic 608; and one or more communication interface(s) 620 coupled to the system control logic 608.

System control logic 608 for one embodiment may include any suitable interface controllers to provide for any suitable interface to the components with which it is coupled. The system control logic 608 may include the controller described above to operate the NVM device 120 and the parity cache 160.

System memory 612 may be used to load and/or store data/instructions, for example, for the host device 600. In some embodiments, the system memory 612 may include the parity cache 160. System memory 612 may include any suitable volatile memory, such as, but not limited to, suitable dynamic random access memory (DRAM).

The NVM device 120 may also be used to load and/or store data/instructions, for example, for the host device 600. The NVM device 120 may include any suitable non-volatile memory, such as, but not limited to, NOR flash memory, NAND flash memory, phase change memory, etc. In some embodiments, system memory 612 may include the parity cache 160.

In some embodiments, instructions 624 may, when executed by the processor(s) 604, result in the host device 600 and/or the NVM device 120 and parity cache 160 performing at least some of the operations described above. The instructions may be located in the NVM device 120 and/or the system memory 612. In some embodiments, the instructions 624 may additionally/alternatively be located in the system control logic 608.

Communication interface(s) 620 may provide an interface for the host device 600 to communicate over one or more networks and/or with any other suitable device. Communication interface(s) 620 may include any suitable hardware and/or firmware. Communication interface(s) 620 for one embodiment may include, for example, a network adapter, a wireless network adapter, a telephone modem, and/or a wireless modem. For wireless communications, communication interface(s) 620 for one embodiment may use one or more antennas.

For one embodiment, at least one of the processor(s) 604 may be packaged together with logic for one or more controllers of system control logic 608. For one embodiment, at least one processor of the processor(s) 604 may be packaged together with logic for one or more controllers of system control logic 608 to form a System in Package (SiP). For one embodiment, at least one processor of the processor(s) 604 may be integrated on the same die with logic for one or more controllers of system control logic 608. For one embodiment, at least one processor of the processor(s) 604 may be integrated on the same die with logic for one or more controllers of system control logic 608 to form a System on Chip (SoC).

In various embodiments, the host device 600 may be a desktop or laptop computer, a server, a set-top box, a digital recorder, a game console, a personal digital assistant, a mobile phone, a digital media player, a digital camera, etc. The host device 700 may have more or less components and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Similarly, memory devices of the present disclosure may be employed in host devices having other architectures. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising: writing, by a controller, a first data to a plurality of data cells of a first codeword in a non-volatile memory (NVM) device resulting in a first data value; and writing, by the controller, a first parity value reflecting the first data value in the first codeword to a parity cache in a volatile memory.

2. The method of claim 1, further comprising: writing, by the controller, a second data to the plurality of data cells of the first codeword resulting in a second data value; and modifying, by the controller, the first parity value in the parity cache to be a second parity value reflecting the second data value in the first codeword.

3. The method of claim 2, wherein the first codeword has a plurality of parity cells, and the method further comprises invalidating, by the controller, the plurality of parity cells of the first codeword based at least in part on said writing of the first parity value to the parity cache.

4. The method of claim 3, further comprising:
flushing out from the parity cache, by the controller, a third parity value reflecting a third data value of a second codeword in the NVM device having a plurality of data cells and parity cells;
writing, by the controller, the third parity value to the plurality of parity cells of the second codeword based at least in part on said flushing; and
validating, by the controller, the plurality of parity cells of the second codeword.

5. The method of claim 4, wherein said flushing out the third parity value further comprises: determining, by the controller, the third parity value is written least recently relative to other parity values in the parity cache; and flushing out, by the controller, the third parity value based at least in part on said determining that the third parity value is written least recently.

6. The method of claim 3, wherein said writing the first parity value to the parity cache comprises: determining, by the controller, a number of times remaining in a programming cycle that the plurality of parity cells of the first codeword can be programmed coherently with the plurality of data cells of the first codeword, wherein the programming cycle being a consecutive series of programming iterations upon the first codeword without an intervening erase operation; comparing, by the controller, the number of times remaining in the programming cycle with a pre-determined threshold value; and writing the first parity value to the parity cache based at least in part on a result of said comparing.

7. The method of claim 6, wherein said writing of the first parity value to the parity cache comprises writing the first parity value to the parity cache when the determined number of times remaining in the programming cycle is smaller than the predetermined threshold value.

8. The method of claim 6, wherein said writing the first parity value to the parity cache is based at least in part on data existing in the plurality of data cells of the first codeword just prior to the writing of the first data to the plurality of data cells.

9. The method of claim 6, wherein said writing the first parity value to the parity cache is based at least in part on the first data.

10. The method of claim 1, wherein the NVM device is a flash memory device or a phase change memory (PCM) device.

11. A device comprising: memory having instructions that, when executed, cause the device to perform: writing a first data to a plurality of data cells of a first codeword in a non-volatile memory (NVM) device resulting in a first data value; and writing a first parity value reflecting the first data value in the first codeword to a parity cache in a volatile memory.

12. The device of claim 11, the instructions when executed, further cause the device to perform:
writing a second data to the plurality of data cells of the first codeword resulting in a second data value; and
modifying the first parity value in the parity cache to be a second parity value reflecting the second data value in the first codeword.

13. The device of claim 12, wherein the first codeword has a plurality of parity cells, and the instructions when executed, further cause the device to perform: invalidating the plurality of parity cells of the first codeword based at least in part on said writing of the first parity value to the parity cache.

14. The device of claim 13, the instructions when executed, further cause the device computer to perform: flushing out from the parity cache a third parity value reflecting a third data value of a second codeword having a plurality of data cells and parity cells; writing the third parity value to a plurality of parity cells of the second codeword based at least in part on said flushing; and validating the plurality of parity cells of the second codeword.

15. The device of claim 14, wherein said flushing out the parity value further comprises: determining the third parity value is written least recently relative to other parity values in the parity cache; and flushing out the third parity value based at least in part on said determining that the third parity value is written least recently.

16. The device of claim 13, wherein said writing the first parity value to the parity cache comprises:
determining a number of times remaining in a programming cycle that a plurality of parity cells of the first codeword can be coherently programmed with the plurality of data cells of the first codeword, the programming cycle being a consecutive series of programming iterations upon the first codeword without an intervening erase operation;
comparing the number of times remaining in the programming cycle with a predetermined threshold value; and
writing the first parity value to the parity cache based at least in part on a result of said comparing.

17. The device of claim 16, wherein said writing of the first parity value to the parity cache comprises writing the first parity value to the parity cache when the determined number of times remaining in the programming cycle is smaller than the pre-determined threshold value.

18. The device of claim 16, wherein said writing the first parity value to the parity cache is based at least in part on data existing in the plurality of data cells of the first codeword just prior to the writing of the first data to the plurality of data cells.

19. The device of claim 16, wherein said writing the first parity value the parity cache is based at least in part on the first data.

20. The device of claim 11, wherein the NVM device is a flash memory device or a phase change memory (PCM) device.

21. An apparatus comprising:
a non-volatile memory (NVM) device, comprising a plurality of codewords, wherein each codeword comprises a plurality of data cells configured to store a data value and a plurality of parity cells configured to store a parity value reflecting the data value stored in the same codeword;
a parity cache, configured to store parity values of the plurality of codewords; and
a controller, coupled with the NVM device and the parity cache, configured to manage storage of parity values stored in the NVM device and in the parity cache.

22. The apparatus of claim 21, wherein the controller is further configured to write a parity value reflecting the data value in one of the plurality of codewords to the parity cache and invalidate the plurality of parity cells in the one of the plurality of codewords.

23. The apparatus of claim 22, wherein the controller is configured to conduct:
flushing out another parity value from the parity cache;

writing the another parity value to the plurality of parity cells of another one of the plurality of codewords corresponding to the another parity value based at least in part on said flushing; and
validating the plurality of parity cells of the another one of the plurality of codewords.

24. The apparatus of claim 21, wherein the NVM device is a flash memory device or a phase change memory (PCM) device.

* * * * *

UNITED STATES PATENT AND TRADEMARK OFFICE
CERTIFICATE OF CORRECTION

PATENT NO. : 8,321,775 B2
APPLICATION NO. : 12/427706
DATED : November 27, 2012
INVENTOR(S) : Christopher Bueb Page 1 of 1

It is certified that error appears in the above-identified patent and that said Letters Patent is hereby corrected as shown below:

On the Title Page, Item (56), column 2, under "Other Publications", line 2, delete "Transactionso N Informationt Heory,vol." and insert -- Transactions on Information Theory, vol. --, therefor.

Signed and Sealed this
Sixteenth Day of July, 2013

Teresa Stanek Rea
*Acting Director of the United States Patent and Trademark Office*